United States Patent [19]
Fuoss

[11] Patent Number: 6,012,745
[45] Date of Patent: Jan. 11, 2000

[54] TUBE CONNECTION OF TWO OVERLAPPING TUBES AND METHOD OF MAKING SAME

[75] Inventor: Klaus Fuoss, Balingen, Germany

[73] Assignee: Dr. Ing. h.c.F. Porsche AG, Germany

[21] Appl. No.: 09/109,862

[22] Filed: Jul. 6, 1998

[30] Foreign Application Priority Data

Jul. 5, 1997 [DE] Germany .......................... 197 28 815

[51] Int. Cl.⁷ .................................................. F16L 21/08
[52] U.S. Cl. .......................... 285/400; 285/420; 285/424; 29/445
[58] Field of Search ................................ 285/420, 424, 285/419, 400; 29/445

[56] References Cited

U.S. PATENT DOCUMENTS

| | | | |
|---|---|---|---|
| 669,161 | 3/1901 | Dieckmann | 285/420 |
| 704,936 | 7/1902 | Scherer | 285/424 X |
| 1,975,925 | 10/1934 | Compo | 285/424 X |
| 2,598,338 | 5/1952 | Arbogast | 285/419 X |
| 4,418,948 | 12/1983 | Lew et al. | 285/420 |
| 4,466,642 | 8/1984 | Tonchen | 285/424 X |
| 4,609,213 | 9/1986 | Tonchen | 285/424 X |

*Primary Examiner*—Dave W. Arola
*Attorney, Agent, or Firm*—Evenson, McKeown, Edwards & Lenahan, P.L.L.C.

[57] ABSTRACT

In the case of the pipe connection of two overlapping pipes a flexible ring is arranged between the interior pipe and the exterior pipe and, before the bracing, is axially displaceable on the interior pipe. The flexible ring and the exterior pipe have a spherical interacting outer and inner contour which ensures the angular mobility. The fixing of the pipe connection after the adjustment takes place by two tensioning bows which are fixedly mounted on the exterior pipe. This permits a particularly easy handling during the adjustment and the fixing of the pipe connection.

21 Claims, 1 Drawing Sheet

TUBE CONNECTION OF TWO OVERLAPPING TUBES AND METHOD OF MAKING SAME

BACKGROUND AND SUMMARY OF THE INVENTION

This application claims the priority of German application 197 28 815.4, filed in Germany on Jul. 5, 1997, the disclosure of which is expressly incorporated by reference herein.

The invention relates to a pipe connection of two mutually overlapping pipes, particularly for connecting exhaust pipes of an internal-combustion engine, according to the type of the main claim.

This type of a pipe connection is known from German Patent Document DE 39 08 060 C2, in which a flexible ring with a spherical outer contour is arranged between the interior pipe and the exterior pipe. During the mounting, this flexible ring can be axially displaced on the interior pipe. In the case of this pipe connection, which permits a longitudinal adjustment as well as an angular compensation of the pipes to be mutually connected, after the adjustment, the pipes are fixed by means of a tensioning element which reaches over the exterior pipe in the overlapping area. This tensioning element consists of two tensioning parts which are screwed to one another and whose interior contour in each case has the shape of half a spherical section. In the overlapping area, these tensioning parts rest, on the one hand, against an exterior pipe and, on the other hand, against the flexible ring. Such a pipe connection permits a longitudinal adjustment and an angular compensation of the pipes to be connected with one another. However, the manufacturing expenditures for the components and the mounting expenditures for such a pipe connection are relatively high.

In contrast, it is an object of the invention to improve a pipe connection of the above-mentioned type of two mutually overlapping pipes, particularly for connecting exhaust gas pipes of an internal-combustion engine, which permits a longitudinal compensation and an angular compensation of the pipes to be connected with one another, in such a manner that the mounting is simplified and the component expenditures are reduced.

According to the invention, this object is achieved by providing a pipe connection of two mutually overlapping pipes, particularly for connecting exhaust pipes of an internal-combustion engine, having an exterior pipe which has a pipe section which is spherically expanded in the overlapping area, having a slotted flexible ring with a spherical outer contour between the exterior pipe and the interior pipe, and having a tensioning arrangement for the bracing of the exterior pipe, the interior pipe and the flexible ring, wherein the tensioning element is fixedly connected with the exterior pipe.

By means of the firm connection of the tensioning element with the exterior pipe, the mounting expenditures during the adjusting and fixing of the pipe connection are clearly simplified because the number of the structural elements to be handled is reduced. In addition to facilitating the mounting, this saving of structural components also reduces costs because of the decreased material and manufacturing expenditures.

Particularly when the requirements on the tightness of the pipe connection are relatively low, for example, in the case of tail pipes of an exhaust system, the manufacturing expenditures for the production of the components can clearly be reduced again if the flexible ring is provided with only one continuous separating cut. This achieves a flexibility of the flexible ring required for the firm fixing of the pipe elements to be connected with one another, without the requirements of several cuts arranged only along a partial length and possibly in an offset manner.

Advantageously, a firm connection of the two pipe elements is achieved in that, in the overlapping area, the exterior pipe has one cut which extends at least approximately axially so that, during the fixing of the pipe connection, it is possible to reduce the diameter of the exterior pipe.

The fixing of the pipe connection after the length and angle adjustment can be achieved in a particularly simple manner in that the tensioning element has two bent tensioning bows which are braced approximately tangentially with respect to the exterior pipe.

A particularly simple and low-cost implementation of the pipe connection is obtained if the tensioning bows of the tensioning element are welded to the exterior pipe. In this case, a band-shaped material can be utilized in a particularly advantageous manner which has a rounded section which, in each case, rests against the exterior pipe and changes into an end section which is bent approximately radially with respect to the exterior pipe.

Other objects, advantages and novel features of the present invention will become apparent from the following detailed description of the invention when considered in conjunction with the accompanying drawings.

DETAILED DESCRIPTION OF THE DRAWINGS

Figure 1:
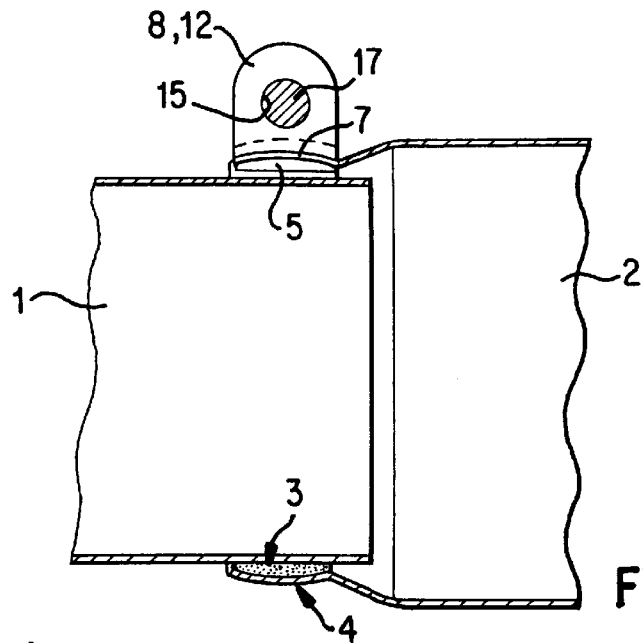
FIG. 1 is a longitudinal sectional view of a pipe connection constructed in accordance with a preferred embodiment of the invention.
Figure 2:
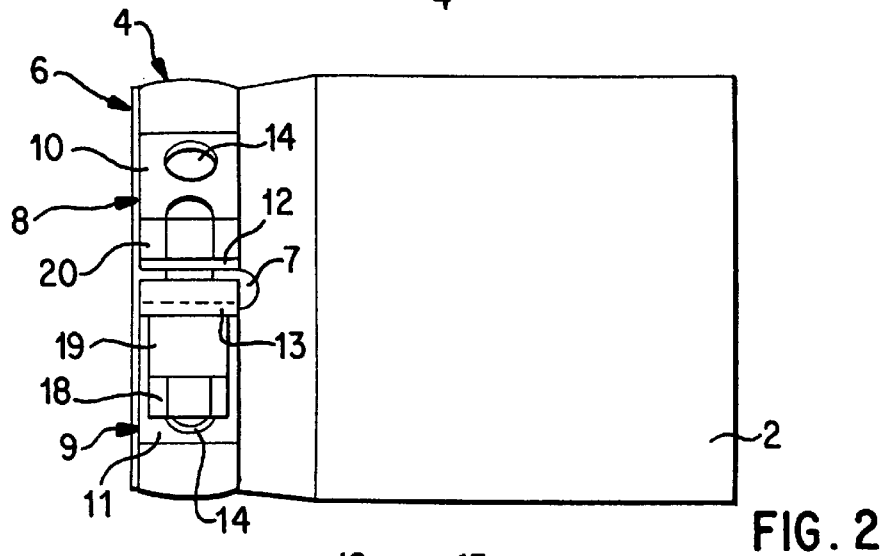
FIG. 2 is a top view of the exterior pipe in the overlapping area.
Figure 3:
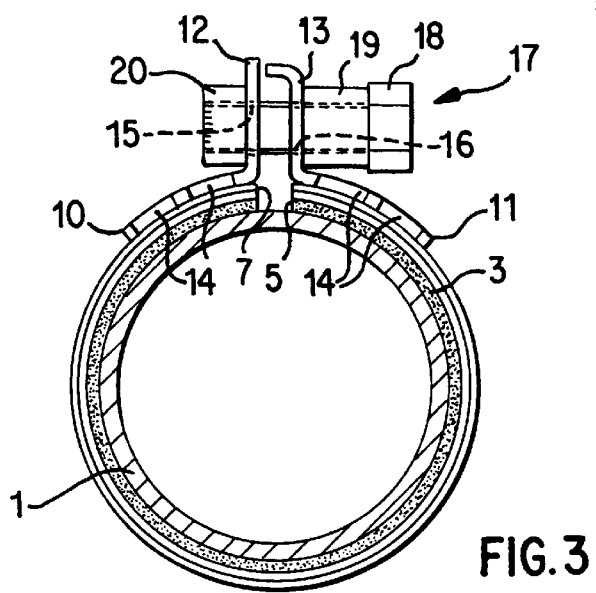
FIG. 3 is an end view of the face of the exterior pipe.

In the case of the pipe connection illustrated in FIG. 1, an interior pipe 1, which is cylindrical at least in the end area, and an exterior pipe 2, which is cylindrical at least in the overlapping area, are connected with one another. A flexible ring 3 reaches around the interior pipe 1 whose inside diameter is adapted such to the outside diameter of the interior pipe that this flexible ring is axially displaceable on the interior pipe during the mounting. The flexible ring 3 has a spherical outer contour which is curved to the outside and on which the interior side of a pipe section 4 of the exterior pipe 2 rests which is correspondingly spherically expanded. The flexible ring 3 has an approximately axially extending, continuous separation cutout 5, whose width is selected such that a force-locking bracing of the flexible ring on the interior pipe is facilitated.

In the area of the pipe section 4, the exterior pipe 2 reaches around the flexible ring 3, the spherical inner contour resting against the outer contour of the flexible ring. This pipe section 4 has a cutout 7 which extends from the face 6 in an approximately axial manner and whose width is dimensioned such that a force-locking bracing of the pipe section on the flexible ring or the interior pipe is possible. On both sides of the cutout 7, a tensioning bow 8, 9 is fastened on the exterior pipe 2 or on the pipe section 4, which tensioning bow 8, 9 in each case has a curved section 10, 11 and an end section 12, 13 which is bent approximately radially with respect to the exterior pipe 2. The curved sections 10 and 11 each rest on the exterior side of the pipe section 4 and are fixedly connected with it. This firm connection can take place, for example, by welding. For this purpose, two openings 14 are provided in each of the curved sections, the welding taking place on the edges of the openings 14. However, it is also contemplated according to other embodiments of the invention to weld the tensioning bows, for example, on the exterior sides of the curved sections, to the pipe section 4.

The two mutually spaced, bent end sections 12 and 13 are provided with aligned bores 15 and 16 through which a tensioning screw 17 projects. By means of a screw head 18 and with the insertion of a sleeve 19, this tensioning screw 17 rests against the end section 13 and is screwed together with a nut 20 which rests against the opposite end section 12. In order to again simplify the handling during the mounting of the pipe connection, the nut 20 can be firmly connected to the end section 12, for example, by welding.

During the mounting of the two pipes, a longitudinal adjustment is possible before the bracing because of the axial displaceability of the flexible ring 3 on the interior pipe. Because of the interacting spherical outer and inner contour of the flexible ring and of the exterior pipe, the angle can simultaneous be adjusted. By the tightening of the screwed connection after the adjusting operation, the pipe section 4 is force-lockingly braced by way of the flexible ring 3 on the interior pipe 1. Because of the separating cutout 5 and of the cutout 7, the change of dimension or reduction of the diameter of the pipe section and of the flexible ring required for this purpose can be implemented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pipe connection of two mutually overlapping pipes, comprising:

an interior pipe and an exterior pipe, said exterior pipe has a pipe section which is spherically expanded in an area where the exterior pipe overlaps the interior pipe;

a flexible ring with a spherical outer contour between the exterior pipe and the interior pipe; and a tensioning arrangement for the clamping of the exterior pipe, the interior pipe and the flexible ring, wherein the tensioning element is fixedly connected with the exterior pipe.

2. Pipe connection according to claim 1, wherein the flexible ring is slotted.

3. Pipe connection according to claim 2, wherein the exterior pipe has an at least approximately axially extending slot in the overlapping area between the exterior and interior pipes.

4. Pipe connection according to claim 2, wherein the tensioning arrangement has two bent end sections which are fastened approximately tangentially with respect to the exterior pipe.

5. Pipe connection according to claim 2, wherein the tensioning arrangement is welded to the exterior pipe.

6. Pipe connection according to claim 2, wherein the tensioning arrangement consists of band-shaped material pieces which have a curved section, which in each case rests on the exterior pipe, and an end section which is bent approximately radially to the exterior pipe.

7. Pipe connection according to claim 1, wherein the exterior pipe has an at least approximately axially extending slot in the overlapping area.

8. Pipe connection according to claim 7, wherein the tensioning arrangement has two bent end sections which are fastened approximately tangentially with respect to the exterior pipe.

9. Pipe connection according to claim 7, wherein the tensioning arrangement is welded to the exterior pipe.

10. Pipe connection according to claim 7, wherein the tensioning arrangement consists of band-shaped material pieces which have a curved section, which in each case rests on the exterior pipe, and an end section which is bent approximately radially to the exterior pipe.

11. Pipe connection according to claim 1, wherein the tensioning arrangement has two bent end sections which are fastened approximately tangentially with respect to the exterior pipe.

12. Pipe connection according to claim 11, wherein the tensioning arrangement is welded to the exterior pipe.

13. Pipe connection according to claim 11, wherein the exterior pipe is slotted between the two bent end sections.

14. Pipe connection according to claim 13, wherein the tensioning arrangement is welded to the exterior pipe.

15. Pipe connection according to claim 13, wherein the flexible ring is slotted.

16. Pipe connection according to claim 13, wherein the exterior pipe has an at least approximately axially extending slot in the overlapping area between the exterior and interior pipes.

17. Pipe connection according to claim 1, wherein the tensioning arrangement is welded to the exterior pipe.

18. Pipe connection according to claim 1, wherein the tensioning arrangement consists of band-shaped material pieces which have a curved section which in each case rests on the exterior pipe, and an end section which is bent approximately radially to the exterior pipe.

19. A method of making a pipe connection of the type connecting internal and external exhaust pipe parts, said method comprising:

providing an internal pipe part with a cylindrical end section, providing an external pipe part with a part spherical end section and a pair of tensioning elements fixed to an exterior surface of the external pipe part;

slidably placing a part spherical slotted flexible ring over the cylindrical end section with insertion thereof into the external pipe part such that spherical end sections, the slotted ring and the external pipe part are in axial alignment, and applying a tensioning member to said pair of tensioning elements to clamp the external pipe part around the internal pipe part.

20. A method according to claim 19, wherein said tensioning elements are welded to the external pipe part.

21. A pipe connection for connecting exhaust pipes of an internal-combustion engine, comprising:

an interior pipe and an exterior pipe, said exterior pipe has a pipe section which is spherically expanded in an area where the exterior pipe overlaps the interior pipe;

a flexible ring with a spherical outer contour between the exterior pipe and the interior pipe; and a tensioning arrangement for the clamping of the exterior pipe, the interior pipe and the flexible ring, wherein the tensioning element is fixedly connected with the exterior pipe.

* * * * *